United States Patent

[11] 3,612,398

[72] Inventor Richard H. Timms
San Diego, Calif.
[21] Appl. No. 52,210
[22] Filed July 6, 1970
[45] Patented Oct. 12, 1971
[73] Assignee Rohr Corporation
Chula Vista, Calif.

[54] MODULATABLE NOZZLE SYSTEM
12 Claims, 7 Drawing Figs.
[52] U.S. Cl. ................................................. 239/127.3,
239/265.19
[51] Int. Cl. ...................................................... B64d 33/04
[50] Field of Search ........................................... 239/127.3,
265.19, 265.11; 60/271

[56] References Cited
UNITED STATES PATENTS
3,237,864 3/1966 Taylor et al. .................. 239/127.3
3,391,869 7/1968 Glass .............................. 239/265.19

Primary Examiner—M. Henson Wood, Jr.
Assistant Examiner—John J. Love
Attorney—George E. Pearson ABSTRACT: Apparatus generally includes a convergent-divergent outer nozzle duct and a dual cone nozzle plug within and coaxial with the duct and serving as an inner nozzle duct defining with the outer duct a variable area flow path of annular cross section. Forward cone section extends forward from plane of throat of outer duct and aft cone extension extends rearward from throat plane to exit plane. Nose cone forward of dual cones streamlines entire plug. Both cone sections are made up of elongate peripherally overlapping petals with aft ends of forward petals pivoted to forward end of aft petals. Forward ends of forward petals are pivoted to mounting ring on central coaxial support member. Aft ends of forward petals are pivoted to support struts which are pivoted to axially moving second mounting ring to expand and contract both cones at throat plane. Aft ends of aft petals are pivotally connected to actuating struts which are pivotally connected to sleeve which slides axially on support member to expand and contract aft end of aft cone independently of expansion and contraction at throat plane. Support member is hollow, and air supplied to it from external source flows to and through the petals and the forward tip of the nose cone to cool the parts exposed to the hot exhaust gases.

PATENTED OCT 12 1971
3,612,398
SHEET 1 OF 3
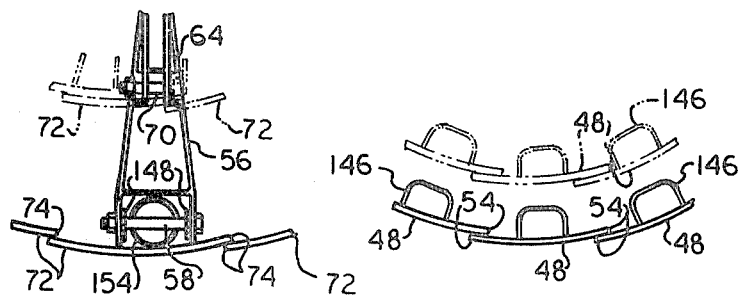
FIG. 4    FIG. 5
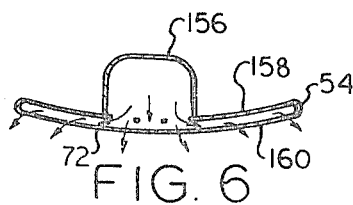
FIG. 6
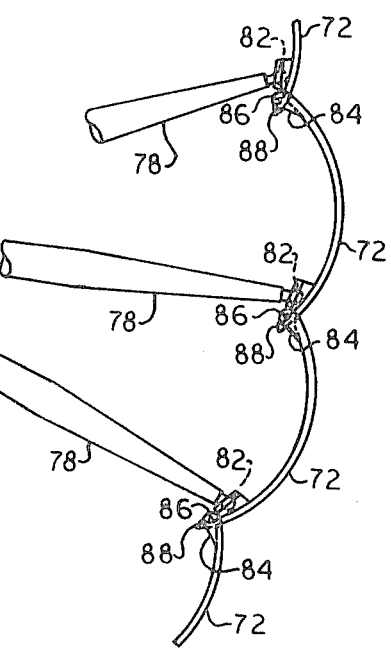
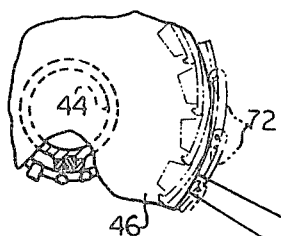
FIG. 3
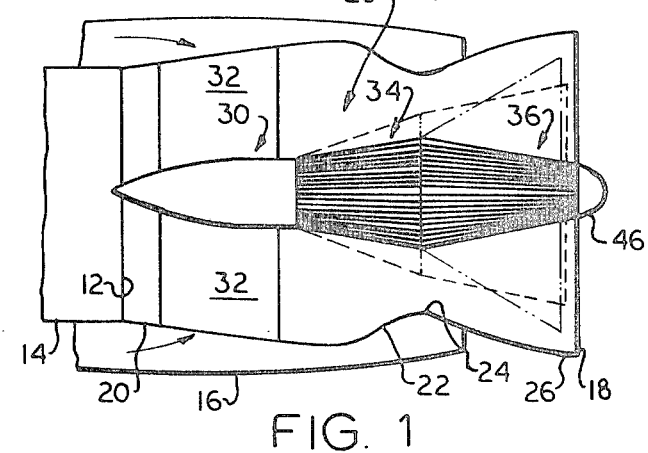
FIG. 1
INVENTOR
RICHARD H. TIMMS
BY
ATTORNEY INVENTOR.
RICHARD H. TIMMS
BY
George E. Pearson
ATTORNEY 3,612,398

MODULATABLE NOZZLE SYSTEM

BACKGROUND OF THE INVENTION

This invention lies in the field of gas turbine engines, commonly called jet engines which produce reaction thrust by ejecting a high velocity stream of gas from the exhaust nozzle of the gas turbine, and is directed to apparatus for varying the area or profile of the nozzle to achieve optimum operating conditions for varying flight regimes.

The patent to Benjamin G. Glass, U.S. Pat. No. 3,391,869, issued July 9, 1968, explains in detail the various flight conditions of jet-engined airplanes and the nozzle configuration best suited for each condition. In general, it is pointed out that a convergent nozzle is suited for subsonic and low supersonic flight while a convergent-divergent nozzle is required for very high speeds such as Mach 1.5 or higher. Thus, an airplane which is intended for operation over substantial periods of time at speeds in these various ranges requires a nozzle with a variable profile.

The Glass Patent discloses a nozzle having a dual cone nozzle plug mounted coaxially therein, and which can be adjusted throughout a wide range of profiles to achieve high thrust efficiency under widely varying operating conditions. However, the apparatus for expanding and contracting the cones is rather complicated, is subject to vibration, and includes many small components which are subject to wear and failure and are difficult to repair.

My copending U.S. Pat. application, Ser. No. 887,061, filed Dec. 22, 1969, is based on a thrust-modulating plug structure with improved actuation of the aft ends of the petals of the forward section, the aft ends of the petals of the aft section being nonexpansible.

SUMMARY OF THE INVENTION

The present invention provides a dual cone nozzle plug of the same general configuration as the plug disclosed in the Glass patent, and my pending application, either of which may be used with the same outer nozzle duct or with other outer nozzle ducts. The apparatus for actuating the cones of the present application is relatively simple in design and provides superior rigidity and durability with low maintenance costs, and it is provided with means to supply adequate cooling air to every component which is subjected to the heat of the exhaust gases.

Generally stated, the apparatus comprises an elongate hollow support member which is adapted to be mounted coaxially in an outer nozzle duct and may be rigidly secured in place by one or more radial struts extending from a forward portion of the support member to the wall of the outer nozzle duct. The struts may be hollow to serve as flow paths for cooling air supplied by a bypass duct, compressor bleed, or the like.

The dual cones surround and are supported by the intermediate and aft portions of the support member, while the forward portion is preferably formed as a tapered nose cone to divide the exhaust gases and cause them to flow smoothly over the cones. Each cone is made up of a plurality of slender elongate leaves or petals which are arranged in peripherally overlapping sliding relation. The forward ends of the forward petals are pivotally connected to a first mounting ring on the support member and their aft ends are pivotally connected to a plurality of support struts which in turn are pivotally connected at their inner ends to a second, axially sliding, mounting ring. The axial movement of this ring causes the aft ends of the forward petals to expand and contract. In order to produce a straight line motion with the aft ends of the petals in a common plane perpendicular to the axis of the support member, a plurality of guide struts may be pivoted at their inner ends to a third, fixed, mounting ring and pivotally connected at their outer ends to intermediate points on the support struts. This construction is particularly desirable when the aft ends of the petals must be maintained precisely in the plane of the throat of an outer nozzle duct.

The forward ends of the aft petals are pivotally connected to the aft ends of the forward petals to expand and contract with them and maintain a smooth contour. The aft ends of the aft petals are pivotally connected to the outer ends of a plurality of actuating struts, the inner ends of which are pivotally connected to a sleeve which slides axially on the support member to cause the aft ends of the aft petals to expand and contract in the general plane of the exit end of an outer nozzle duct. In the presently preferred form, a pair of drive motors are housed in the nose cone portion of the support member, and are drivingly connected to the sleeve and to the second mounting ring to cause their axial movement and the expansion and contraction of the intermediate and aft ends of the dual cone.

Cooling air from a selected source enters through a hollow strut into the forward portion of the support member and flows through the member and a plurality of articulated conduits to the joints between the forward and aft petals. Each petal is formed on its inner face with a generally axially directed hollow stiffener which communicates at the joint with the associated conduit to deliver cooling air along the length of the petal. The petals are preferably hollow with a porous outer wall to provide transpiration cooling. The nose cone is formed with a double wall having a forward inlet for flow of cooling air adjacent to its outer wall and the forward tip of the cone is apertured for further transpiration cooling.

It will be apparent that the apparatus disclosed herein is simple and rugged and that ample cooling of the components is supplied to insure long service life.

BRIEF DESCRIPTION OF THE DRAWINGS

Various other advantages and features of novelty will become apparent as the description proceeds in conjunction with the accompanying drawings, in which:

FIG. 1 is a diagrammatic profile view showing the dual cone surfaces in retracted and expanded positions in association with a convergent-divergent outer nozzle duct;

FIG. 3 is a partial schematic view looking inward at the aft end of the plug;

FIG. 4 is a sectional view taken on line 4—4 of FIG. 2b;

FIG. 5 is a sectional view taken along line 5—5 of FIG. 2a; and

FIG. 6 is an enlarged sectional view taken on line 6—6 of FIG. 2b.

DESCRIPTION OF PREFERRED EMBODIMENT

Figure 2A:
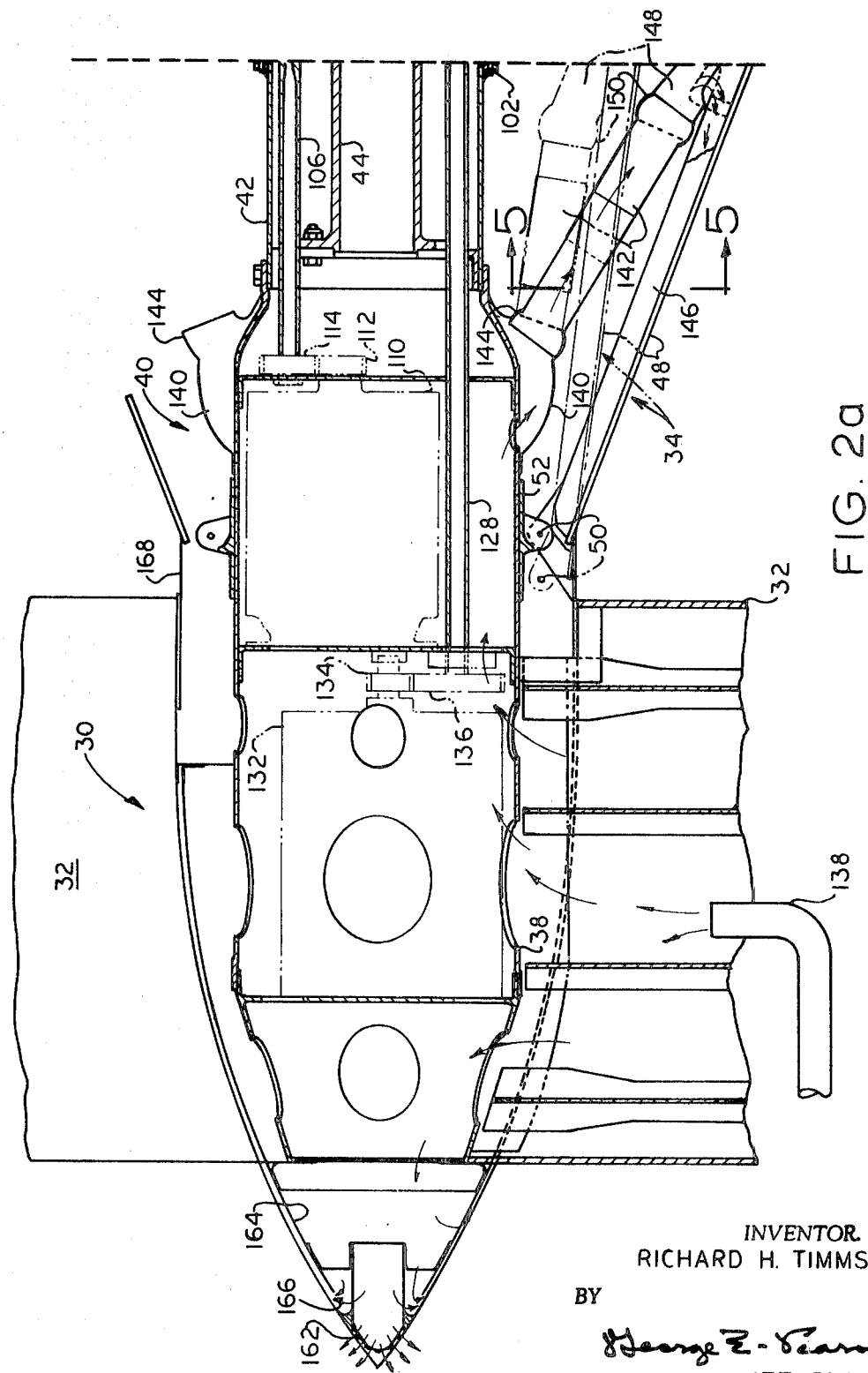
FIG. 2a is a side-elevational view, partly in section, of the forward portion of a nozzle plug incorporating the invention.

The general arrangement of the dual cone nozzle plug in its relation to the outer nozzle duct and other associated parts is schematically illustrated in FIG. 1, in which the outer nozzle duct 10 is connected at 12 to the tailpipe 14 of a jet engine, not shown, and a nacelle 16 surrounds the engine and the major part of duct 10, terminating slightly forward of the exit end 18. Duct 10 comprises a divergent forward section 20, a convergent section 22, a throat 24, and a divergent section 26 terminating at the exit edge 18, and may be shaped as here shown or may have the reentrant curve of a De Laval type nozzle as shown in FIG. 1 of the Glass patent.

The nozzle plug 28 comprises a coaxial support member having a forward section formed as a tapered nose cone 30 rigidly mounted in place by radial struts 32 which are secured to the wall of section 20 of duct 10, and a centrally located rearwardly directed extension, not shown, which supports the forward and aft cones 34 and 36 as well as various other components. Plug 28 in its entirety serves as an inner nozzle duct which cooperates with the outer duct to define a flow path for the exhaust gases, which path varies in area from point to point but is generally annular in cross section. The pointed nose cone divides the gases and causes them to flow smoothly over the dual cones 34 and 36. These two cones are so located that they meet in the plane of throat 24 and are expandable together in that plane. In addition the aft end of cone 36 is expandable in the general plane of exit 18. In the solid line position the net profile of the nozzle is convergent-divergent. In the dotted line position the nozzle is still convergent-divergent but substantially altered for performance in a different flight regime. The phantom line showing of cone 36 converts the nozzle to all convergent for still another flight regime.

Figure 2B:
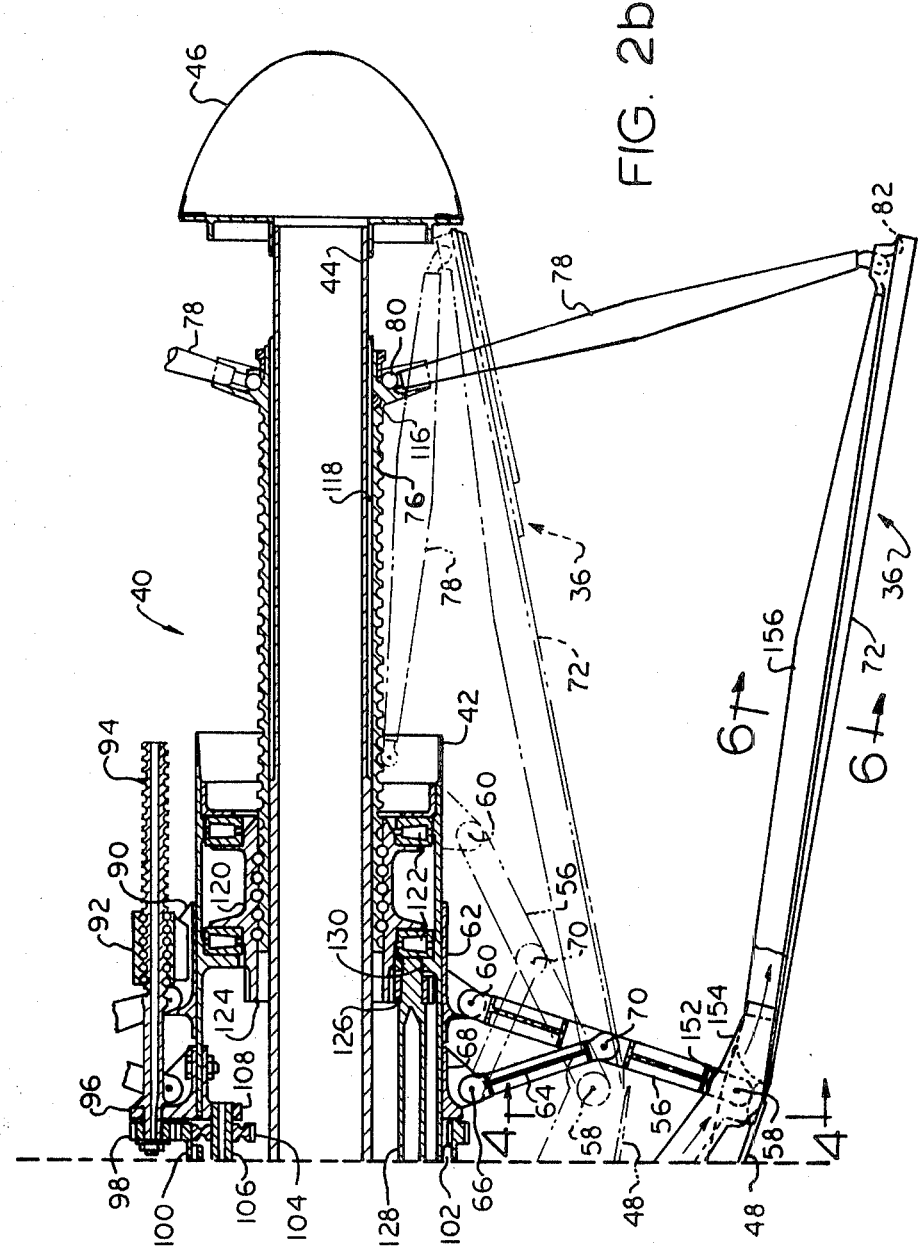
FIG. 2b is a view similar to FIG. 2a showing the aft portion of the plug.

The construction and arrangement of the various elements and components making up the expandable-contractible plug 28 are shown in detail in FIGS. 2a and 2b. The nose cone 30 constitutes a fairing for the forward portion 38 of the coaxial support member 40 and, as will be seen, the hollow struts 32 are secured to both portion 38 and the nose cone and provide flow paths to deliver to portion 38 cooling air supplied by the nacelle or some component of the engine. A reduced diameter portion 42 of the support member is secured to portion 38 and extends rearwardly through the intermediate portion of the plug, and a further reduced portion 44 is an elongate tube which is secured to portion 42 and extends to the aft end of the plug, where cone 46 is secured to it to streamline the plug.

As previously pointed out, each of the cones 34 and 36 is composed of a plurality of elongate petals arranged in peripherally overlapping sliding engagement. As seen in FIG. 2b, the two cones meet at a common plane which is preferably the plane of the throat of a convergent-divergent nozzle. Cone 34 includes petals 48, each of which is pivotally connected at 50 to a first mounting ring 52 carried for limited axial sliding movement on portion 38 of the support member. Thus the forward end of the cone is of constant diameter and the petals swing out in radial planes to increase the cone angle from apex to base while their side edges 54 remain in overlapped relation at all stages of expansion, as will be seen in FIG. 5, to seal the cone against ingress of exhaust gases.

The expanding and contracting movement of the aft ends of petals 48 is effectuated by a plurality of support struts 56, one for each petal, the outer ends of the struts being pivotally connected at 58 to the petals and the inner ends being pivotally connected at 60 to a second mounting ring 62. This ring is axially slidably mounted on the aft section of portion 42 of the support member. When ring 62 is fully forward, struts 56 hold petals 48 and cone 34 out in the solid line position which represents the maximum degree of expansion. When ring 62 moves fully rearward it pulls the petals and cone in to the broken line position which represents the maximum degree of contraction. If the first mounting ring 52 were fixed and there were no other restraint on struts 56, then pivots 58 would swing in an arc and leave the throat plane of the outer nozzle duct. To achieve the desired straight line planar motion, a plurality of guide struts 64 are pivotally mounted at the inner ends at 66 to a third mounting ring 68 which is fixed on portion 42 and their outer ends are pivotally connected at 70 to intermediate points on struts 56. Proper selection of dimensions will produce true straight line or planar motion. The foreshortening effect on the cone is accommodated by a small axial movement of first mounting ring 52.

The aft cone 36 comprises a plurality of petals 72, the forward ends of which are pivotally connected at 58 to petals 48 and to struts 56 to expand and contract in unison with them. The 3-way pivotal connection is illustrated in FIG. 4, where it will also be seen that the forward ends of petals 72 are substantially identical in cross section to the aft ends of petals 48, including side edges 74 which remain in overlapping relation throughout expansion and contraction. Expansion and contraction of the aft end of cone 36 is accomplished by means of a slender elongate sleeve 76 axially slidably mounted on support tube 44 and a plurality of actuator struts 78, one for each petal, which are pivotally connected at 80 to the sleeve and at 82 to the aft ends of petals 72. With the sleeve in full aft position the struts and petals are in the solid line position which represents the maximum degree of expansion. When the sleeve moves to full forward position the struts and petals are in the broken line position which represents the maximum degree of contraction.

Since the degree of expansion and contraction is so much greater at the aft end of cone 36 than at the forward end, it is necessary to gradually increase the curvature of each individual petal toward the rear to allow proper nesting in fully contracted position. Thus the aft ends of petals 72 have the much greater curvature shown in FIG. 3, where it can be seen that they nest snugly in their contracted position and present a daisylike appearance when fully expanded.

Since the aft ends of petals 72 reach a point of minimum overlap it is necessary to take extra precautions to prevent separation or fluttering. To this end, actuator struts 78 are not connected midway of the width of each petal but rather very close to its one side edge. Thus this edge is very rigidly held against undesired movement. The opposite edge is provided with an end flange tip 84 extending radially inward beyond the aft edge of the remainder of the petal. A guide pin 86, such as a "Roll Pin," is fixed in tip 84 and extends a short distance axially forward over the inner surface of the petal. The tip and pin constitute a hook or channel preventing radial separation of adjacent petals. Thus, in the full expansion condition shown in solid lines strut 78 supports one edge of a petal directly and the opposite edge of an adjacent petal indirectly. Circumferential separation of the petal ends is prevented by the provision of an abutment 88 on each petal to engage pin 86.

The mechanism to actuate the second mounting ring 62 for expansion and contraction of the midportion of the nozzle plug is shown in FIG. 2b. Ring 62 is provided with a plurality of brackets 90 spaced around its periphery. A nut member 92, preferably a ball nut, is fixed to each bracket and axially aligned to receive a threaded shaft 94 which is rotatably mounted in a bearing bracket 96 which is preferably integral with the third mounting ring 68. Shaft 94 is held against translation by bracket 96 and planetary gear 98 fixed on the end of the shaft. Ring gear 100 rotates around support member portion 42 on bearing 102 and is provided with external teeth to engage gear 98 and internal teeth to engage drive gear 104. The latter is fixed on the aft end of drive shaft 106 which is mounted in bearing 108. An air motor 110 housed in portion 38 of the support member drives shaft 106 through gears 112 and 114. It will be apparent that rotation of shaft 106 in the appropriate direction will drive all of the planetary gears 98 through ring gear 100 to rotate threaded shafts 94 and move the nut members 92 and the second mounting ring 62 axially rearward. Opposite rotation will move the ring forward.

The mechanism to actuate sleeve 76 for expansion of the aft end of cone 36 is also shown in FIG. 2b. Sleeve 76 is provided with a track follower 116 riding in axial track 118 to prevent rotation. It is also provided with an external thread to engage within rotatable nut member 120, also a ball nut, which is mounted in bearings 122 to rotate around support tube 44. A boss 124 on the forward end of the nut member is provided with teeth to engage drive gear 126, fixedly mounted on drive shaft 128 which is carried in rear bearing 130. An air motor 132, housed in portion 38 of the support member, drives shaft 128 through gears 134 and 136. Rotation of shaft 128 in the appropriate direction will rotate nut member 120 to move sleeve 76 rearward. Opposite rotation will move the sleeve forward.

The cooling air system includes some source of supply, such as an engine component, to provide air through a conduit system symbolized by conduit 138 to the interior of at least one hollow radial strut 32 which holds the support member 40 in place and thence into the forward portion 38 of the support member. The air flows rearward to the plurality of ports 140 and thence through conduits 142 which are connected to the ports by ball joints 144 and are formed of two telescoping lengths of tubing. Each forward petal 48 is formed with an elongate-combined stiffener and air conduit 146, to the aft end of which is secured a flow fitting 148, and each conduit 142 is connected to the fitting by a ball joint 150. Air flows through conduit 142 and fitting 148 into stiffener 146 and thence along the entire length of the petal.

Fitting 148 connects through another ball joint 152, centered on pivot 58, with a flow fitting 154 which in turn is connected with an elongate-combined stiffener and air conduit 156 extending along the length of petal 72 to distribute air therethrough.

FIG. 6 is a typical cross-sectional view of one of the petals 72, the petals 48 being similar in general construction. It will be seen that petal 72 is hollow, having an inner wall 158 and an outer wall 160, while the combined stiffener and conduit 156 opens directly through the inner wall to the interior of the petal to supply air thereto. Wall 160 is porous to allow air to seep therethrough for transpiration cooling of the outer surface.

Air also flows from strut 32 forward into nose cone 30 where a portion passes out through apertures 162 in the extreme tip and another portion passes rearward between the outer wall of the nose cone and a secondary inner wall 164 through an inlet 166. The thin film of air applies a substantial cooling effect to the outer wall of the nose cone which is directly subjected to the impact of the hot exhaust gases. It then passes rearward inside the sliding seal ring 168, which completes the enclosure of the plug, and finally out through the aft end of the plug.

It will be understood that the servomotors 110 and 132 may be placed in other locations and connected to ring 62 and sleeve 76 by remote drive means.

Having thus described the invention, what is claimed as new and useful and desired to be secured by U.S. Letters Patent is:

1. In combination with a jet engine having a tailpipe with a rearwardly discharging nozzle duct adapted to produce reaction thrust, a double modulating plug for varying the discharge area and aerodynamic characteristics of the nozzle duct, said plug comprising:
   a slender, elongate support member rigidly mounted coaxially within said nozzle duct,
   a forward plug section and an aft plug section mounted coaxially of the support member and meeting in a plane intermediate the length of, and perpendicular to the longitudinal axis of, the support member, each of the sections comprising a plurality of slender elongate petals overlapping each other peripherally in sliding relation,
   a first mounting ring mounted for axial movement on a forward portion of the support member;
   means pivotally connecting the forward end of each petal of the forward section to the first mounting ring;
   means pivotally connecting the aft end of each petal of the forward section to the forward end of a corresponding petal of the aft section;
   a second mounting ring mounted for controlled axial adjustment on an intermediate portion of the support member;
   a first plurality of support struts, one pivotally connected at the inner end thereof to the second mounting ring and at the outer end thereof to the aft end of each of the petals of the forward section;
   first controlled power means for moving the second mounting ring axially of the support member to move the outer ends of the first plurality of support struts radially outwardly and inwardly along a plane perpendicular to the axis of the support member to expand and contract the aft end of the forward section and the forward end of the aft section,
   a third mounting ring mounted for controlled axial adjustment on an aft portion of the support member;
   a second plurality of support struts, one pivotally connected at the innner end thereof to the third mounting ring, and at the outer end thereof to an aft portion of each petal of the aft section, and
   second controlled power means for moving the third mounting ring axially of the support member independently of the second mounting ring to expand and contract the aft end of the aft section.

2. A nozzle plug as claimed in claim 1 wherein the third mounting ring is an externally threaded member slidable on and keyed to the support member to prevent relative rotation therebetween, and is moved axially by a nut in threaded engagement therewith and restrained against axial translation, said nut being driven rotatively by said second power means.

3. A nozzle plug as claimed in claim 2, the forward portion of the support member being enlarged and hollow, and the second power means including a drive motor housed within a forward portion of the support member, a rotatable drive shaft extending rearward from the drive motor to the nut member, and a gear connection between the drive shaft and the nut member.

4. A nozzle plug as claimed in claim 1 wherein the first power drive means comprises a plurality of nut elements fixedly secured to the second mounting ring at spaced intervals about its periphery, an equal plurality of externally threaded actuator shafts are similarly spaced about the periphery of the support member, one of said shafts extending axially through each nut element and being restrained against axial translation, and means for rotating the shafts in unison.

5. A nozzle plug as claimed in claim 1; the forward portion of the support member being enlarged and hollow, one of the power means including a rotatable drive motor housed within the forward portion of the support member, a ring gear having internal and external teeth surrounding the support member and rotatably mounted thereon, planetary gears on the actuator shaft engaging the external teeth of the ring gear, a pinion engaging the internal teeth of the ring gear, and a rotatable drive shaft extending rearward from the drive motor, the pinion being fixedly mounted on the aft end of the drive shaft.

6. A nozzle plug as claimed in claim 1, the forward portion of the support member being enlarged and hollow, means for introducing cooling air into the forward portion, the petals of both sections being provided with generally axially directed hollow stiffeners on their inner faces, and conduit means for conducting cooling air directly from the forward portion endwise into the stiffeners of each section to protect the petals against the effects of the hot exhaust gases.

7. A nozzle plug as claimed in claim 6 wherein the hollow stiffeners distribute cooling air lengthwise along the petals, and communicate with the outer walls of the petals which are porous to facilitate transpiration cooling.

8. A nozzle plug as claimed in claim 7 wherein the hollow stiffener of each petal of the forward section extends to its pivotal connection with its corresponding petal of the aft section and a single conduit supplies cooling air to each such connection for forward flow through the hollow stiffener of each petal of the forward section and rearward flow through the hollow stiffener of the corresponding petal of the aft section.

9. A nozzle plug as claimed in claim 6 wherein the conduit means comprises a plurality of articulated conduits connected between the hollow interior of the support member and the interior of each hollow stiffener adjacent the pivotal connection between a petal of the forward section and a corresponding petal of the aft section.

10. A nozzle plug as claimed in claim 6 wherein the forward portion of the support member is tapered forwardly to define a nose cone to divide the rearwardly flowing exhaust gases for smooth flow over the plug, means to supply cooling air to the hollow interior of the nose cone, transpiration openings provided in the extreme forward end of the nose cone, a curtain wall spaced inwardly from the wall of the nose cone to define a passage therebetween for rearward flow of cooling air along the nose cone wall, the hollow interior of the forward portion communicating with the transpiration openings and the forward end of the passage.

11. A nozzle plug as claimed in claim 10 wherein the means supplying cooling air to the interior of the forward portion comprises at least one hollow support strut extending from the nozzle to the support member and serving as a conduit for such cooling air.

12. A nozzle plug as claimed in claim 10 wherein a plurality of separately rotatable actuators are mounted in said forward portion and are drivingly connected one to each of the second and third rings.